US012651684B2

(12) United States Patent　　(10) Patent No.:　US 12,651,684 B2
Katsuya　　　　　　　　　　　　(45) Date of Patent:　　　Jun. 9, 2026

(54) COIL UNIT

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 18/665,607

(22) Filed: May 16, 2024

(65) Prior Publication Data

US 2024/0428968 A1　　Dec. 26, 2024

(30) Foreign Application Priority Data

Jun. 26, 2023　(JP) .................................. 2023-104434

(51) Int. Cl.
　　*H01F 3/02*　　　　(2006.01)
　　*H02J 50/10*　　　(2016.01)
(52) U.S. Cl.
　　CPC ............... *H01F 3/02* (2013.01); *H02J 50/10* (2016.02)
(58) Field of Classification Search
　　CPC .................................. H01F 3/02; H02J 50/10
　　USPC ......................................................... 307/104
　　See application file for complete search history.

(56) References Cited

U.S. PATENT DOCUMENTS 9,209,627 B2 * 12/2015 Baarman ................ H02J 50/005
9,225,392 B2 * 12/2015 Lehr ........................ H01F 5/003

| | | | | |
|---|---|---|---|---|
| 10,044,234 | B2 * | 8/2018 | Muurinen | ................ H02J 50/12 |
| 2012/0119859 | A1 * | 5/2012 | Nishino | ................ H01F 17/045 |
| | | | | 335/297 |
| 2013/0069586 | A1 * | 3/2013 | Jung | ........................ H02J 50/12 |
| | | | | 320/108 |
| 2016/0344223 | A1 * | 11/2016 | Lee | .......................... H02J 50/10 |
| 2017/0264131 | A1 * | 9/2017 | An | .......................... H02J 50/10 |
| 2018/0114629 | A1 | 4/2018 | Maikawa | |
| 2020/0280218 | A1 * | 9/2020 | Tsuda | ........................ H02J 7/02 |
| 2022/0293335 | A1 | 9/2022 | Miller et al. | |

FOREIGN PATENT DOCUMENTS

| | | |
|---|---|---|
| JP | 2020-109777 | 7/2020 |
| JP | 7232960 | 3/2023 |
| WO | 2016/162965 | 10/2016 |

OTHER PUBLICATIONS

Japanese Notice of Allowance for Japanese Patent Application No. 2023-104434 mailed Feb. 4, 2025.

* cited by examiner

*Primary Examiner* — Alfonso Perez Borroto
(74) *Attorney, Agent, or Firm* — Amin, Turocy & Watson, LLP

(57)　　　　　ABSTRACT

A coil unit includes a coil and a core member. The coil receives AC electric power transmitted in a contactless manner from an electric power transmission apparatus. The core member is formed of a directional magnetic material in sheet form. The core member is arranged on a rearward side of the coil when seen from the electric power transmission apparatus when the electric power transmission apparatus and the coil face each other. An outer shape of each of the coil and the core member is a rectangular annular shape. An orientation direction of the core member and a direction along a winding direction of the coil are orthogonal to each other in straight line portions that face each other of the coil and the core member.

3 Claims, 5 Drawing Sheets

COIL UNIT

CROSS-REFERENCE TO RELATED APPLICATION

Priority is claimed on Japanese Patent Application No. 2023-104434, filed on Jun. 26, 2023, the contents of which are incorporated herein by reference.

BACKGROUND

Field of the Invention

The present invention relates to a coil unit.

Background

In recent years, in order to ensure that more people have access to affordable, reliable, sustainable, and advanced energy, research and development relating to charging and electric power supply in a vehicle on which a secondary battery is mounted, which contributes to energy efficiency, has been conducted.

In the related art, in a contactless electric power transmission system that supplies electric power to a vehicle from the outside of the vehicle by contactless electric power transmission, a system is known which includes a back plate made of a magnetic material in order to induce a magnetic flux in the vicinity of each coil on an electric power transmission side and an electric power reception side (for example, refer to Japanese Patent No. 7232960).

SUMMARY

In techniques relating to charging and electric power supply in a vehicle on which a secondary battery is mounted, when performing contactless electric power transmission to the vehicle, it is desired to reduce a magnetic flux (magnetic flux leakage) other than a main magnetic flux that interlinks each coil on an electric power transmission side and an electric power reception side and improve a coupling coefficient while ensuring a desired robustness in an on-vehicle electric power reception-side unit. For example, in the contactless electric power transmission system of the related art described above, when including a back plate formed of a magnetic material such as a ferrite core, there is a possibility that damage such as cracking or chipping of the back plate due to the vehicle body vibration or the like may occur, and a problem arises in which the weight of the electric power reception-side unit is increased.

An aspect of the present invention aims to provide a coil unit capable of reducing magnetic flux leakage and improving a coupling coefficient while preventing damage to a magnetic member. Further, the aspect of the present invention contributes to energy efficiency.

A coil unit according to a first aspect of the present invention includes: a coil that receives AC electric power transmitted in a contactless manner from an electric power transmission apparatus; and a core member that is formed of a directional magnetic material in sheet form and is arranged on a rearward side of the coil when seen from the electric power transmission apparatus when the electric power transmission apparatus and the coil face each other, wherein an orientation direction of the core member is orthogonal to a direction along a winding direction of the coil.

A second aspect is the coil unit according to the first aspect described above, wherein an outer shape of each of the coil and the core member may be a rectangular annular shape, and the orientation direction and the direction along the winding direction may be orthogonal to each other at least in straight line portions that face each other of the coil and the core member.

A third aspect is the coil unit according to the first or second aspect described above, wherein the core member may be formed of a combination of at least four members having an isosceles trapezoid shape having a base angle of 45° obtained by cutting of a band member having a sheet form.

According to the first aspect described above, since the orientation direction of the core member formed of the directional magnetic material is orthogonal to the direction along the winding direction of the coil, induction of a magnetic flux in the vicinity of the coil to a main magnetic flux is promoted, and by reducing magnetic flux leakage (a magnetic flux other than the main magnetic flux), it is possible to improve a coupling coefficient. Even in the sheet form, by the orientation direction of the core member, it is possible to prevent an increase in iron loss, and it is possible to improve a so-called Q value and ensure a desired output.

In the case of the second aspect described above, by the outer shape of each of the coil and the core member being a rectangular annular shape, the orientation direction of the core member and the direction along the winding direction of the coil can be easily orthogonal to each other in the straight line portions that face each other, and it is possible to easily realize a reduction of the magnetic flux leakage and improvement of the coupling coefficient.

In the case of the third aspect described above, the core member having a rectangular annular shape is formed of the combination of at least four members that have an isosceles trapezoid shape and are obtained from the band member, and thereby, it is possible to prevent a decrease in a yield ratio.

DESCRIPTION OF EMBODIMENTS

Hereinafter, a coil unit according to an embodiment of the present invention will be described with reference to the attached drawings.

Figure 1:
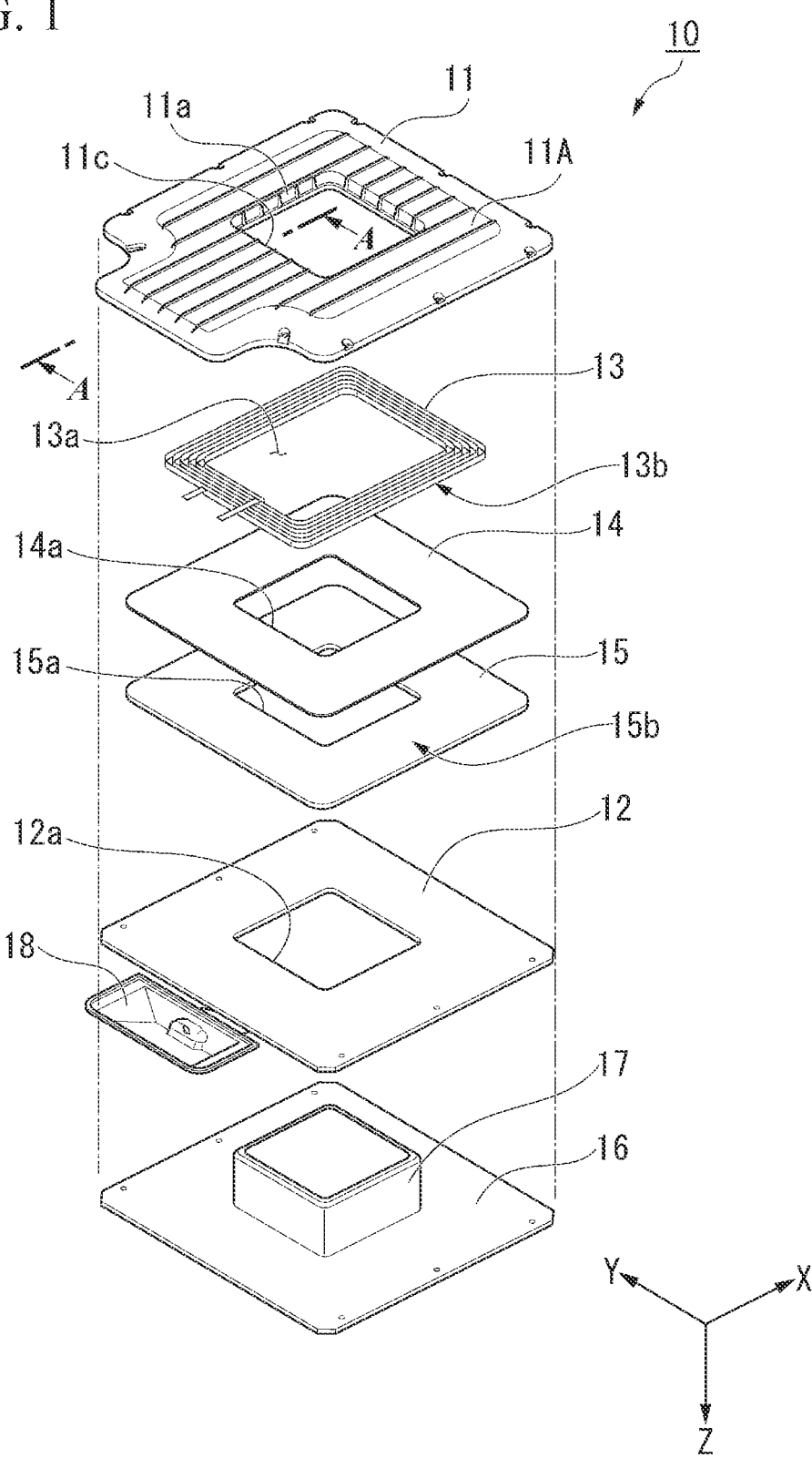
FIG. 1 is an exploded perspective view showing a configuration of a coil unit in an embodiment of the present invention.
Figure 2:
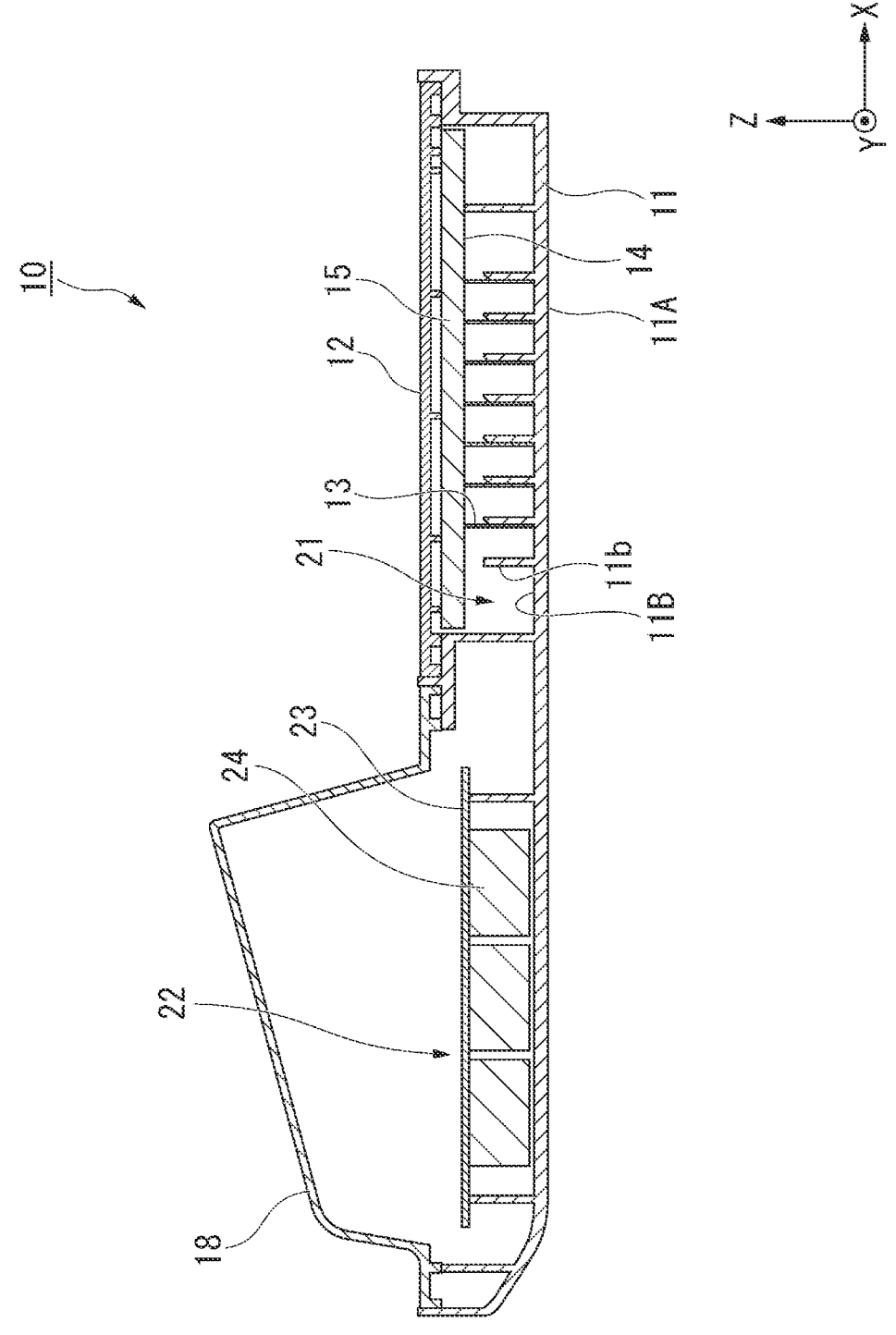
FIG. 2 is a cross-sectional view of the coil unit in the embodiment of the present invention cut along a Z-X plane at a position of an A-A line shown in FIG. 1.

FIG. 1 is an exploded perspective view showing a configuration of a coil unit 10 in an embodiment. FIG. 2 is a cross-sectional view of the coil unit 10 in the embodiment cut along a Z-X plane at a position of an A-A line shown in FIG. 1.

Hereinafter, each axis direction of the X-axis, the Y-axis, and the Z-axis orthogonal to one another in a three-dimensional space is a direction parallel to each axis. For example, as shown in FIG. 1 and FIG. 2, the Z-axis direction is parallel to an upward-downward direction of a movable body such as a vehicle on which the coil unit 10 is mounted, the X-axis direction is parallel to a forward-rearward direction of the movable body, and the Y-axis direction is parallel to a rightward-leftward direction of the movable body. For example, a positive direction of the Z-axis is an upward direction of the movable body, a positive direction of the X-axis is a forward direction of the movable body, and a positive direction of the Y-axis is a right direction of the movable body.

The coil unit 10 of the embodiment is mounted, for example, on a vehicle which receives electric power from the outside by contactless electric power transmission. The coil unit 10 is fixed, for example, to a lower portion of a sub-frame that has a frame shape and is provided on a lower portion of a vehicle body. The coil unit 10 constitutes part of an electric power reception apparatus that receives AC electric power from an external electric power transmission apparatus T (refer to FIG. 4 described later) by contactless electric power transmission.

As shown in FIG. 1 and FIG. 2, the coil unit 10 includes, for example, a housing 11, a first cover 12, a coil 13, an insulation member 14, a core member 15, a back member 16, an inner member 17, and a second cover 18.

An outer shape of the housing 11 is formed, for example, in a rectangular frame shape. The housing 11 includes, for example, a first accommodation portion 21 in which the coil 13 described later, the insulation member 14, and the core member 15 are arranged and a second accommodation portion 22 in which a board 23 and a capacitor 24 described later are arranged. The first accommodation portion 21 is provided, for example, so as to surround a lower side in an upward-downward direction, and an inner side and an outer side in a direction orthogonal to the upward-downward direction of the coil 13, the insulation member 14, and the core member 15 described later. The second accommodation portion 22 is provided, for example, on a further rearward side than the first accommodation portion 21 in a forward-rearward direction. The second accommodation portion 22 is provided, for example, so as to surround a lower side in the upward-downward direction, and an outer side in the direction orthogonal to the upward-downward direction of the board 23 and the capacitor 24 described later.

The housing 11 includes, for example, a front surface 11A on which a plurality of grooves 11*a* are formed. The front surface (that is, a lower surface which is a surface on the lower side in the upward-downward direction) 11A of the housing 11 is exposed to the outside below the vehicle body. The plurality of grooves 11*a* are formed, for example, along the forward-rearward direction along a flow direction of wind (travel wind) received at the time of traveling of the vehicle.

The housing 11 includes, for example, a plurality of heat release members 11*b* that protrude inward from an inner surface 11B on the back side relative to the front surface 11A. An outer shape of the heat release member 11*b* is, for example, a fin having a plate shape. The plurality of heat release members 11*b* are in contact with the coil 13.

An outer shape of the first cover 12 is formed, for example, in a rectangular plate shape in which a penetration hole 12*a* is formed in a thickness direction. The first cover 12 is provided, for example, so as to surround an upper side in the upward-downward direction of the coil 13, the insulation member 14, and the core member 15 described later. The first cover 12 forms an accommodation space in which the coil 13, the insulation member 14, and the core member 15 are accommodated between the inner surface 11B of the housing 11 and the first cover 12. The first cover 12 closes an open end of the first accommodation portion 21 of the housing 11 in which the coil 13, the insulation member 14, and the core member 15 are accommodated.

An outer shape of the coil 13 is formed, for example, in a rectangular spiral shape along the inner surface 11B of the housing 11. A strand of the coil 13 is in direct contact with the plurality of heat release members 11*b*.

An outer shape of the insulation member 14 is formed, for example, in a rectangular sheet shape in which a penetration hole 14*a* is formed in the thickness direction. The insulation member 14 is formed of a material having an electric insulation property.

An outer shape of the core member 15 is formed, for example, in a rectangular sheet shape in which a penetration hole 15*a* is formed in the thickness direction. The core member 15 is formed of, for example, a magnetic material having relatively large permeability such as a non-directional (isotropic) magnetic material such as a ferrite, or a directional (anisotropic) magnetic material of an electromagnetic steel sheet such as a silicon steel sheet or a soft magnetic material such as a nanocrystalline soft magnetic material.

Figure 3:
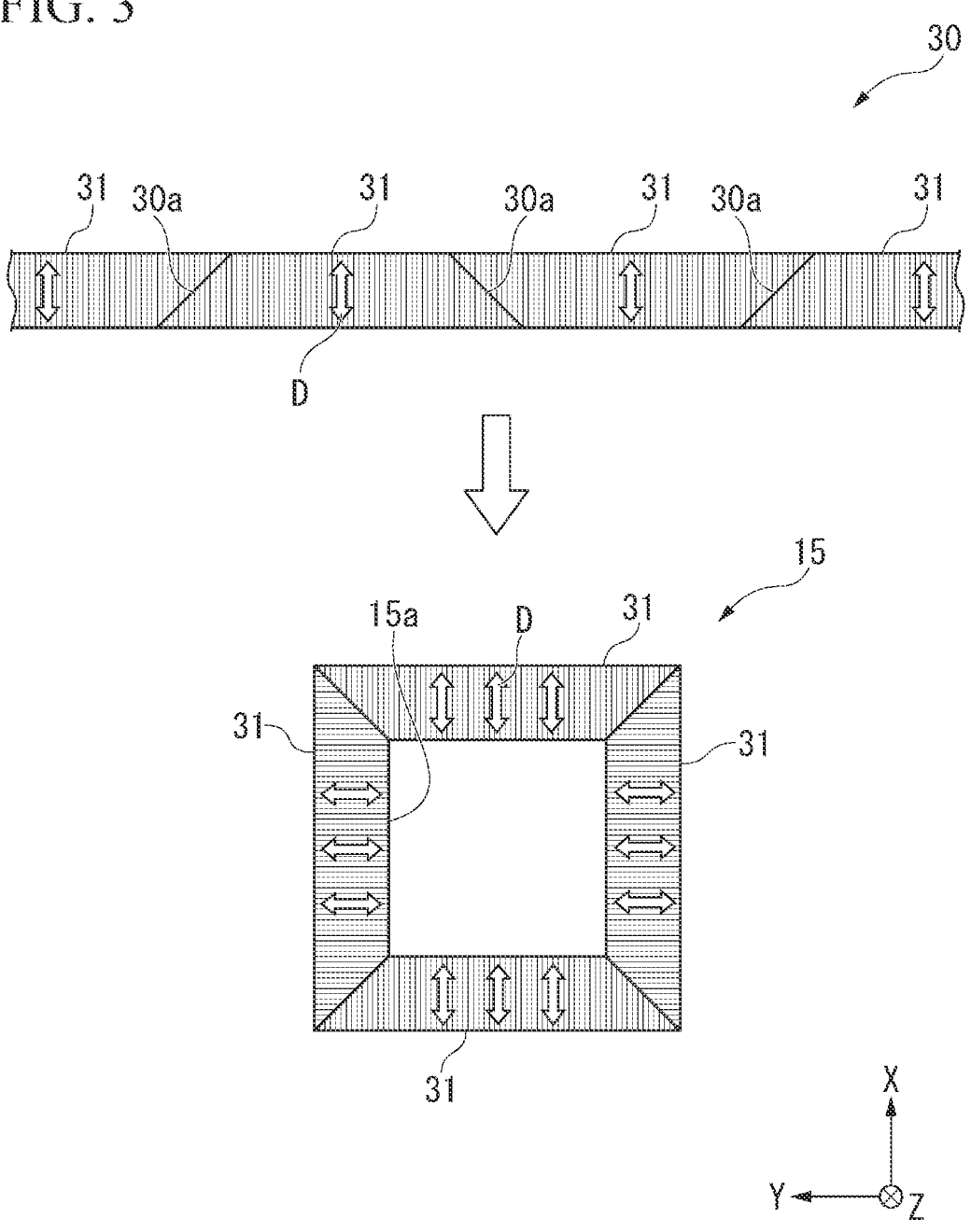
FIG. 3 is a view showing a core member formed of a directional magnetic material and a band member for obtaining four members that form the core member in the coil unit of the embodiment of the present invention.

FIG. 3 is a view showing the core member 15 by a directional magnetic material and a band member 30 for obtaining four members 31 that form the core member 15 in the coil unit 10 of the embodiment.

As shown in FIG. 3, the core member 15 formed of the directional magnetic material is obtained, for example, from the band member 30 of a laminate body having a sheet form formed by laminating a plurality of thin-film magnetic sheets formed of the directional magnetic material in the thickness direction. An orientation direction D of the band member 30 is, for example, parallel to a direction (shorter direction) orthogonal to a longer direction and the thickness direction of the band member 30.

For example, the core member 15 having a rectangular annular shape is formed of a combination of the four members 31 obtained from the band member 30 having a sheet form. The four members 31 are obtained, for example, by cutting the band member 30 in the thickness direction along a plurality of cut lines 30*a* that are set to be inclined by 45° relative to the orientation direction D of the band member 30. An outer shape of each member 31 is an isosceles trapezoid shape having a base angle of 45° when seen from the thickness direction. The four members 31 form the core member 15 having a rectangular sheet shape in which the penetration hole 15*a* is formed in the thickness direction by joining leg sides of the adjacent members 31 to each other.

As shown in FIG. 1 and FIG. 2, an outer shape of the back member 16 is formed, for example, in a rectangular plate shape in which a penetration hole is formed in the thickness direction. An outer shape of the inner member 17 is formed, for example, in a box shape that includes a wall portion having a rectangular frame shape and a lid portion that closes a lower open end of the wall portion. The inner member 17 protrudes, for example, downward in the upward-downward direction from a circumferential edge portion that surrounds the penetration hole of the back member 16. The back member 16 and the inner member 17 are integrally formed of, for example, a magnetic material having relatively large permeability such as an electromagnetic steel sheet such as a silicon steel sheet.

The back member 16 is arranged, for example, on an upper side in the upward-downward direction relative to the first cover 12.

The inner member 17 is inserted, for example, in the penetration holes 12a, 15a, 14a of the first cover 12, the core member 15, and the insulation member 14, an empty core region 13a of the coil 13, and a penetration hole 11c in the thickness direction of the housing 11. The inner member 17 protrudes, for example, downward from the front surface 11A of the housing 11.

An outer shape of the second cover 18 is formed, for example, in a hipped roof shape. The second cover 18 closes, for example, an open end of the second accommodation portion 22 of the housing 11 in which an electric device such as the board 23 and the capacitor 24 are accommodated.

The board 23 fixes, for example, a plurality of electronic components that constitute part of the electric power reception apparatus such as the capacitor 24.

The capacitor 24 is, for example, a resonant capacitor (condenser) or the like connected to the coil 13. The plurality of capacitors 24 are fixed to the board 23 and are in contact with the inner surface 11B of the housing 11, for example, via a thermally conductive material such as a thermal compound.

In the coil unit 10, the coil 13, the insulation member 14, and the core member 15 are sequentially laminated along the upward-downward direction and are arranged in the first accommodation portion 21 of the housing 11.

The orientation direction D of the core member 15 formed of the directional magnetic material is orthogonal to a direction along a winding direction of the coil 13. For example, when the outer shape of each of the coil 13 and the core member 15 is a rectangular annular shape, the coil 13 has a straight line portion 13b, the core member 15 has a straight line portion 15b, and the orientation direction D is orthogonal to the direction along the winding direction at least in the straight line portions 13b, 15b that face each other in the upward-downward direction.

Figure 4:
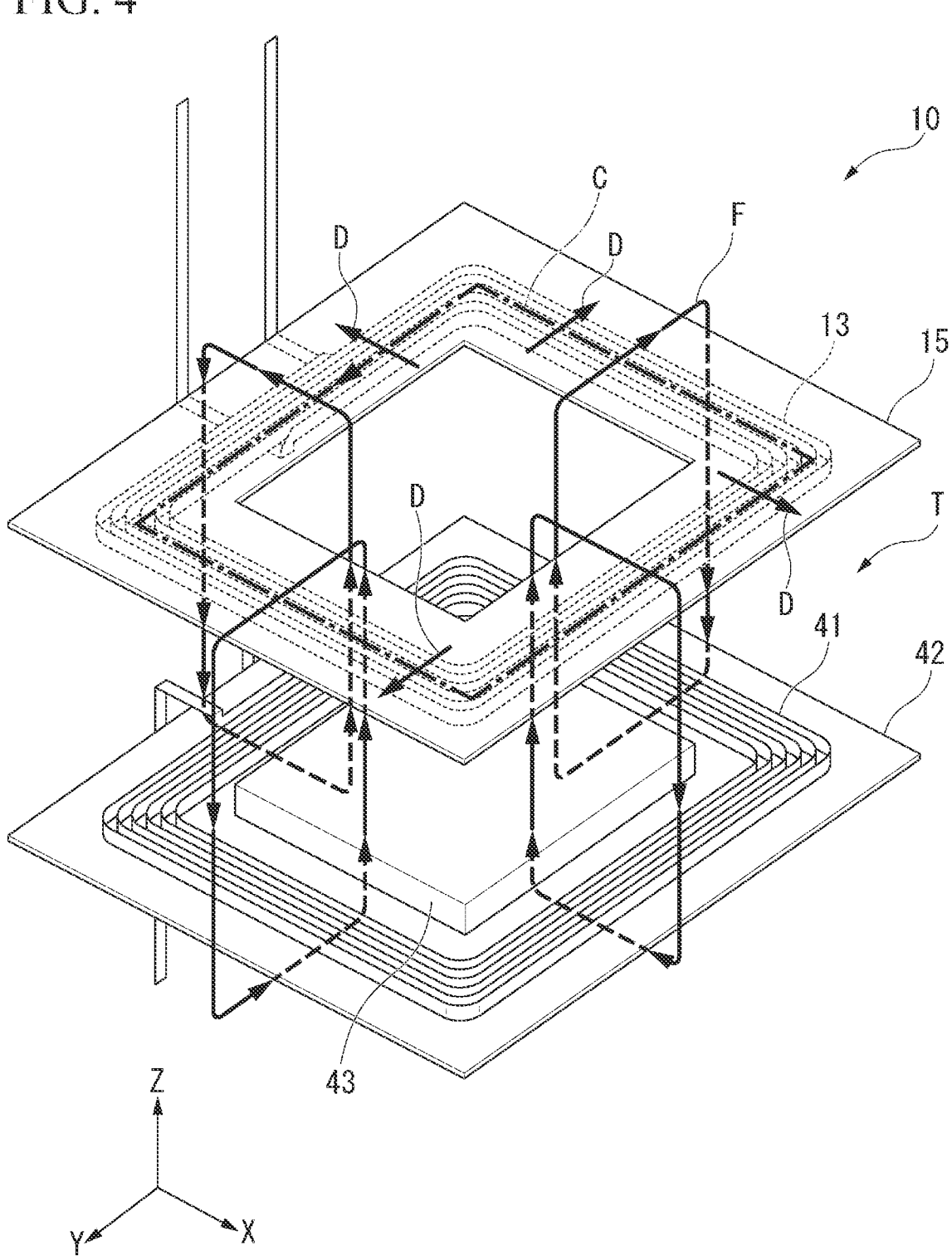
FIG. 4 is a view showing a magnetic flux in the vicinity of the coil unit of the embodiment of the present invention and a coil unit of an electric power transmission apparatus.

FIG. 4 is a view showing a magnetic flux in the vicinity of the coil unit 10 of the embodiment and a coil unit of the electric power transmission apparatus T. In the coil unit 10 shown in FIG. 4, the inner member 17 inserted into the empty core region 13a of the coil 13 is omitted.

The coil unit of the electric power transmission apparatus T shown in FIG. 4 includes, for example, a coil 41, a core member 42, and an inner member 43. An outer shape of the coil 41 is, for example, a rectangular spiral shape. An outer shape of the core member 42 is, for example, a rectangular plate shape. An outer shape of the inner member 43 is, for example, a rectangular box shape.

In a state where the coil 13 of the coil unit 10 of the embodiment and the coil 41 of the electric power transmission apparatus T face each other, the core member 15 of the coil unit 10 is arranged on a rearward side of the coil 13 when seen from the electric power transmission apparatus T, and the core member 42 is arranged on a rearward side of the coil 41 when seen from the coil unit 10 of the embodiment. The inner member 43 protrudes, for example, from the core member 42 toward the coil unit 10 side and is inserted into an empty core region of the coil 41.

The core members 15, 42 and the inner members 17, 43 of the coil unit 10 and the electric power transmission apparatus T induce a magnetic flux in the vicinity of the coils 13, 41 to a main magnetic flux F. The core member 15 formed of the directional magnetic material of the coil unit 10 promotes induction of the magnetic flux to the orientation direction D that is orthogonal to a direction C along the winding direction of the coil 13.

Figure 5:
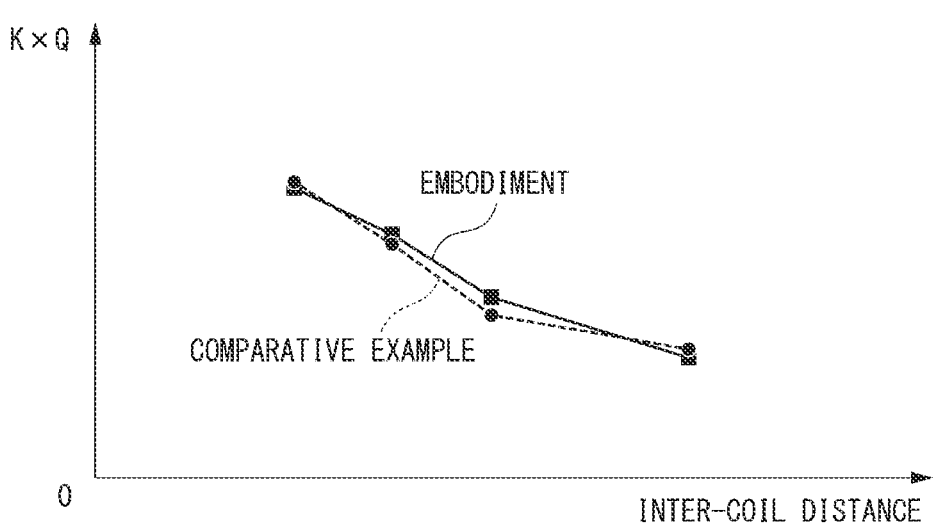
FIG. 5 is a graph showing an example of a correspondence relationship between a KQ product (a product of a coupling coefficient and a quality coefficient) and an inter-coil distance (a distance in a direction orthogonal to a facing direction) between the coil unit of the electric power transmission apparatus, and the coil unit of the embodiment of the present invention and a coil unit of a comparison example.

FIG. 5 is a graph showing an example of a correspondence relationship between a KQ product (a product of a coupling coefficient and a quality coefficient) and an inter-coil distance (a distance in a direction orthogonal to a facing direction) between the coil unit of the electric power transmission apparatus T, and the coil unit of the embodiment and a coil unit on an electric power reception side in a comparison example.

In the embodiment shown in FIG. 5, the core member 15 of the coil unit 10 has a sheet form, formed of a nanocrystalline soft magnetic material, and the core member 42 of the electric power transmission apparatus T has a plate shape formed of a ferrite. In the comparison example, the core member on the electric power reception side and the core member 42 of the electric power transmission apparatus T have a plate shape formed of a ferrite. The core member 15 of the embodiment is, for example, a laminate body formed by laminating five thin-film magnetic sheets having a thickness of 0.5 mm per sheet in the thickness direction. The core member on the electric power reception side of the comparison example is, for example, a magnetic body having a plate shape and having a thickness of 5 mm. The weight of the core member 15 of the embodiment is, for example, less than half (about 1/2.66) of the weight of the core member on the electric power reception side of the comparison example.

As shown in FIG. 5, the KQ products of the embodiment and the comparison example have a substantially similar property change.

As described above, according to the coil unit 10 of the embodiment, since the orientation direction D of the core member 15 formed of the directional magnetic material is orthogonal to the direction C along the winding direction of the coil 13, it is possible to promote induction of the magnetic flux in the vicinity of the coil 13 to the main magnetic flux. By reducing magnetic flux leakage (a magnetic flux other than the main magnetic flux), it is possible to improve a coupling coefficient. Even in the sheet form, by the orientation direction D of the core member 15, it is possible to prevent an increase in iron loss, and it is possible to improve a so-called Q value and ensure a desired output.

For example, by the core member 15 being formed of a laminate body of a thin-film magnetic sheet formed of a nanocrystalline soft magnetic material or the like, for example, as compared to the case where a core member is formed of a magnetic material having a plate shape such as a ferrite, it is possible to prevent damage such as cracking or chipping from occurring, and it is possible to reduce the weight to less than half while ensuring a desired output.

By the outer shape of each of the coil 13 and the core member 15 being a rectangular annular shape, the orientation direction D of the core member 15 and the direction C along the winding direction of the coil 13 can be provided so as to be easily orthogonal to each other in the straight line portion 13b of the coil 13 and the straight line portion 15b of the core member 15 that face each other, and it is possible to easily realize a reduction of the magnetic flux leakage and improvement of the coupling coefficient.

The core member 15 having a rectangular annular shape is formed of the combination of at least four members 31 that have an isosceles trapezoid shape and are obtained from the band member 30, and thereby, it is possible to prevent a decrease in a yield ratio.

The embodiments of the present invention have been presented as examples and are not intended to limit the scope of the invention. The embodiments can be implemented in a variety of other modes, and various omissions, substitutions, and modifications can be made without departing from the scope of the invention. The embodiments and modifications thereof are included within the scope and gist of the invention and are also included within the scope of the invention described in the appended claims and equivalents thereof.

What is claimed is:

1. A coil unit, comprising:
   a coil that receives AC electric power transmitted in a contactless manner from an electric power transmission apparatus; and
   a core member that is formed of a directional magnetic material in a sheet form and is arranged on a rearward side of the coil when seen from the electric power transmission apparatus when the electric power transmission apparatus and the coil face each other,

wherein a magnetization direction of the core member is aligned in an orientation direction by the core member being formed of the directional magnetic material, and the orientation direction of the core member is orthogonal to a direction along a winding direction of the coil.

2. The coil unit according to claim 1, wherein a shape of the coil is a rectangular annular shape having an opening, a shape of the core member is a rectangular annular shape having an opening, and the orientation direction and the direction along the winding direction are orthogonal to each other at least in straight line portions that face each other of the coil and the core member.

3. The coil unit according to claim 2, wherein the core member is formed of a combination of at least four members having an isosceles trapezoid shape having a base angle of 45° obtained by cutting of a band member having a sheet form.

* * * * *